United States Patent [19]

Reasor

[11] Patent Number: 4,917,124
[45] Date of Patent: Apr. 17, 1990

[54] BAR-B-Q RACK CLEANING APPARATUS

[76] Inventor: Warren Reasor, 15088 Ardmore, Detroit, Mich. 48227

[21] Appl. No.: 286,229

[22] Filed: Dec. 19, 1988

[51] Int. Cl.$^4$ .............................................. B08B 3/04
[52] U.S. Cl. ................................. 134/120; 134/186; 134/201; 280/47.131
[58] Field of Search .................... 134/84, 117, 61, 135, 134/201, 155, 120, 166 R, 186, 194; 206/303, 305; 248/130, 133, 371; 211/126, 170; 68/210, 232; 366/45, 62, 65, 185; 280/47.131, 47.26

[56] References Cited

U.S. PATENT DOCUMENTS

| 1,238,641 | 8/1917 | Coon .................................... 134/201 |
| 1,979,241 | 11/1934 | Albanese et al. ............ 134/201 UX |
| 2,186,600 | 1/1940 | Benrens ............................. 134/84 X |

FOREIGN PATENT DOCUMENTS

| 323868 | 8/1926 | Fed. Rep. of Germany ...... 134/201 |
| 1132277 | 3/1957 | France ................................. 134/201 |
| 303124 | 1/1955 | Switzerland ........................ 134/201 |
| 3306 | of 1913 | United Kingdom ................ 134/201 |

Primary Examiner—Frankie L. Stinson
Attorney, Agent, or Firm—Dykema Gossett

[57] ABSTRACT

A container for cleaning Bar-B-Q racks is shaped to receive both round and rectangular racks. The container has U-shaped vertical side walls, rectangular shaped vertical end walls and a semi-circular bottom wall. The top of the container is opened and a Bar-B-Q rack and a solution for cleaning the Bar-B-Q rack are introduced into and removed from the container via this opening. The semi-circular shaped bottom wall and U-shaped side walls provide for the container to be supported in a manner whereby, after cleaning, the container can be conveniently tipped to pour the cleaning solution out of the top opening. The shape of the container also provides for it to be supported within a cralde on a cart for transport. The cart has wheels which enable the container to be rolled from place to place and the cradle is formed by a fabric that is draped onto and secured to the frame of the cart.

2 Claims, 1 Drawing Sheet

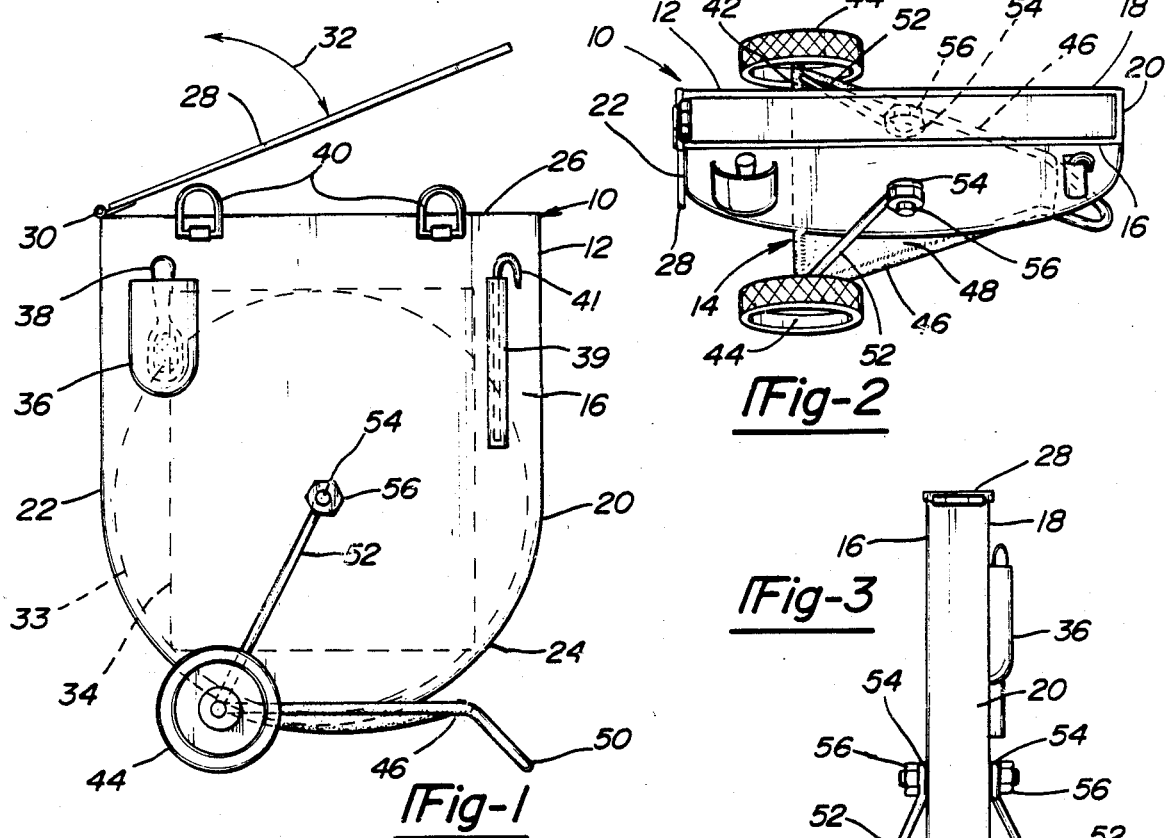
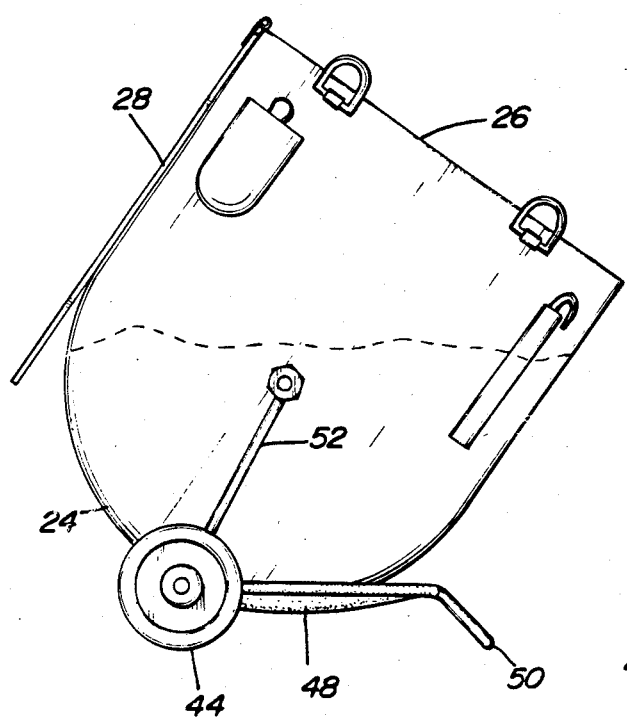
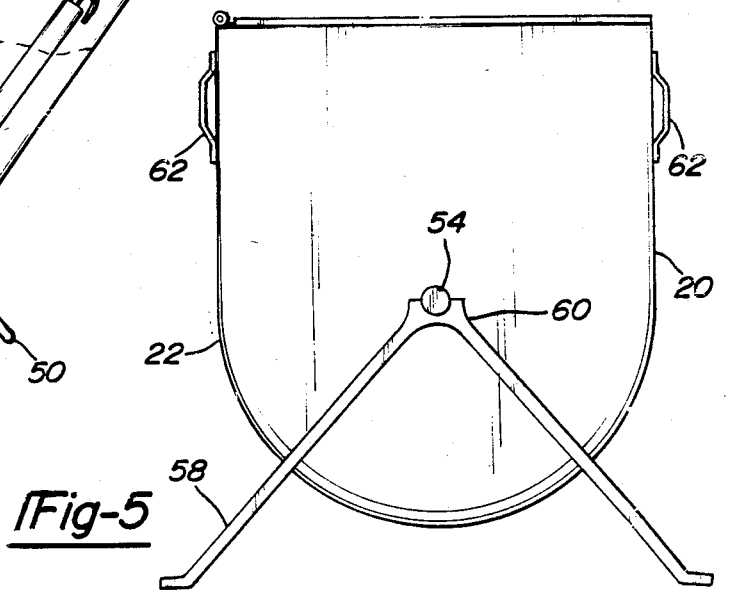

BAR-B-Q RACK CLEANING APPARATUS

This invention relates to apparatus for cleaning Bar-B-Q racks.

When a Bar-B-Q is used, the food to be cooked is placed on a wire rack, or grill, that is disposed above the heating source. Because the food being cooked is directly on the rack, the rack is subject to becoming soiled with baked-on food remnants. These baked-on food remnants are very difficult to clean. Removal of a soiled rack from the Bar-B-Q and immersion of the soiled rack in a cleaning solution for an extended period of time is a very good way to loosen and remove the soiling. This invention relates to an apparatus that is adapted to perform this type of a cleaning function.

The invention has many advantages. One advantage is that the cleaning apparatus can be used with racks that have either round or rectangular shapes. Another advantage is that the apparatus can be conveniently transported. Another advantage is that the cleaning solution can be conveniently poured out after use. Still another advantage is that the apparatus can be conveniently stored. Yet another advantage is that the apparatus can be used for the safe storage of a Bar-B-Q rack after cleaning.

These advantages, along with additional ones, will be seen in the following description which should be considered with reference to the accompanying drawings.

There are five drawings figures.

FIG. 1 is a side elevational view of the Bar-B-Q rack cleaning apparatus of this invention.

FIG. 2 is a top view of FIG. 1.

FIG. 3 is an end elevational view of FIG. 1.

FIG. 4 is a view similar to FIG. 1 illustrating one of the steps in the use of the cleaning apparatus.

FIG. 5 is a side elevational view illustrating a modified form of cleaning apparatus.

FIGS. 1, 2 and 3 show a Bar-B-Q rack cleaning apparatus 10 which comprises a container 12 and a cart 14 on which the container is removably supported. For purposes of illustration, FIG. 2 shows the container tipped slightly on the cart. Container 12 has vertical U-shaped side walls 16 and 18. It also has vertical rectangular end walls 20 and 22. The end walls 20 and 22 are joined by a semi-circular bottom wall 24. The lower portions of side walls 16 and 18 are semi-circular, and so the container thereby forms a U-shaped volume which can be filled with a liquid solution that is adapted for cleaning Bar-B-Q racks. The container also has a rectangular shaped opening 26 at the top and it is via this opening that the container is filled with cleaning solution and that a Bar-B-Q rack is loaded for cleaning.

The container further includes a lid 28 for removably closing opening 26. A convenient way for attaching the lid is by hinging it to the container at the top of one of the end walls, as indicated by the reference numeral 30. In this way, the lid can be opened and closed by swinging it in the manner of arrow 32 about hinge 30. If desired, the lid and the top of the container around opening 26 can have complementary parts of a zipper enabling the lid to be zippered closed with respect to the container when the lid is covering opening 26.

As can be seen in FIG. 1, the unique shape of container 12 enables it to receive both a round Bar-B-Q rack 33 and a rectangular shaped Bar-B-Q rack 34.

The container 12 also has a pocket 36 on the outside that may be used for holding a cleaning brush 38 that is often used to aid in cleaning of the rack, and there are also two loops 40 on the outside of the container near the top opening. These loops enable the container to be hung up on a pair of hooks when the container is separated from cart 14. A further pocket 39 on the outside of container 12 holds a wire left hook 41 that can be used to lift a Bar-B-Q rack out of the container.

Attention is now directed to details of cart 14. As can be seen in FIG. 2 the cart has a generally triangular shape. One side of the triangle is formed by a bar 42 on whose ends are mounted rotatable wheels 44. The other two sides are formed by rods 46. A generally triangular shaped fabric 48 whose sides are supported on bar 42 and rods 46 forms a cradle for the bottom of container 12. This cradle can be seen in FIGS. 1 and 3. A rest 50 is provided at the point of the triangle where rods 46 join with each other and this rest 50 serves, in cooperation with wheels 44, to support the cradle in a generally horizontal disposition. If the end of the cart that contains rest 50 is elevated off the ground, then the cart can be rolled along wheels 44.

Rather than relying strictly upon the cradle for support of container 12, a pair of struts 52 extend from outboard points on bar 42 to locations on the sides of container 12 that are spaced above the cradle. Where the struts engage the sides of the container, the struts have holes that fit onto threaded studs 54 on the outside of the container. The struts are held in place on the studs by means of nuts 56 that are screwed onto the studs. It is desirable to utilize the struts 52 when the cart is used to transport the container from place to place.

The apparatus is used for cleaning by placing a soiled Bar-B-Q rack into the container via opening 26 after lid 28 has been opened. The container is filled with cleaning solution either before or after the rack has been loaded into the container. The container is then allowed to stand for a certain amount of time so that the solution can act upon the soiled rack and loosen the soil from the rack. Once the soil has been loosened from the rack, the rack can be removed from the container and the contents of the container poured out. Because the container is mounted on the cart, it is particularly convenient for transport to a suitable location where the contents can be poured out.

Pouring out is accomplished in the manner indicated by FIG. 4. The combination of the cradle in the cart and the semi-circular bottom of the container enables the container to be tipped in the manner shown so that the contents can be poured out from opening 26 after lid 28 has been opened.

After use, struts 52 can be disconnected from the container, the container lifted off of the cart, and the container hung up by the loops 40. It is also possible to leave the clean Bar-B-Q rack inside the container for storage. Because the container is relatively thin in comparison to its width and height, it will not protrude substantially from a wall on which it may be hung.

FIG. 5 shows another embodiment which shows the container on a stand 58. The stand has receptacles go onto which the studs 54 are placed so that the container is cradled on the stand. In this embodiment the container also has handles 62 for lifting the container onto and off of the stand.

What is claimed is:

1. Barbeque rack cleaning apparatus comprising a container for cleaning barbeque racks comprising sides, ends and a bottom, and an open top, said sides, ends and bottom forming an interior space for a barbeque rack and a cleaning solution for the barbeque rack, said container having said sides spaced more closely to each other than said ends so that the container is comparatively thin in relation to its height and width, said sides have a U-shape that is semicircular at the bottom, said end walls having rectangular shapes and said bottom wall having a semicircular shape fitting to the bottom of said sides so that both round and rectangular barbeque racks and be received within the container;

further comprising a cart having a triangularly shaped frame including a transverse bar and a pair of converging rods at their one ends connected to end portions of said bar, and at their other ends connected together;

a pair of wheels journaled upon the outer ends of said bar; and a flexible generally concave cradle of a fabric material and of triangular shape spanning and interconnecting said bar and rods yieldably supportably mounting said container in an upright position;

said container being adapted to rotatably tilt upon said cradle sufficient to pour liquids therefrom.

2. In the barbeque cleaning rack of claim 2, further comprising a pair of converging struts upon opposite sides of said container at their one ends connected to outer end portions of said bar, inclined upwardly and at their other ends engaging central portions of the container upon its opposite sides and removably secured thereto.

* * * * *